Sept. 15, 1936.  P. M. CURRIER  2,054,670
ELECTRIC VALVE CONVERTING APPARATUS
Filed Aug. 28, 1935
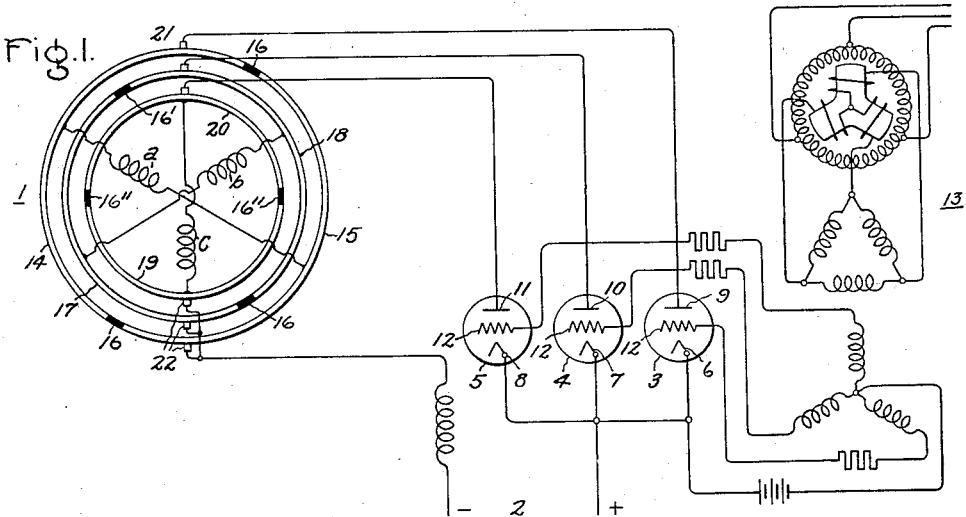
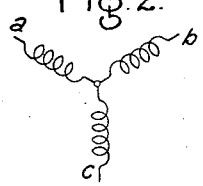
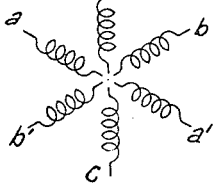
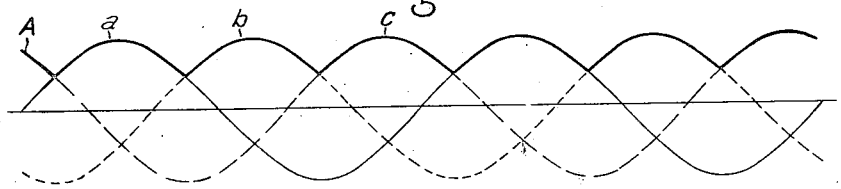
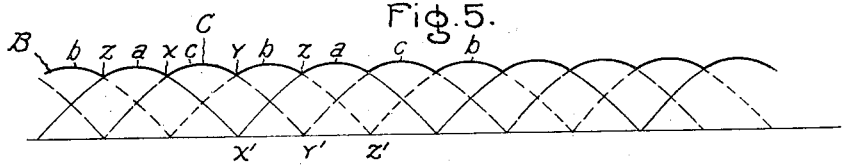
Inventor:
Philip M. Currier,
by Harry E. Dunham
His Attorney.

Patented Sept. 15, 1936

2,054,670

UNITED STATES PATENT OFFICE 2,054,670

ELECTRIC VALVE CONVERTING APPARATUS

Philip M. Currier, Ballston Lake, N. Y., assignor to General Electric Company, a corporation of New York Application August 28, 1935, Serial No. 38,197

13 Claims. (Cl. 171—228)

My invention relates to electric valve converting apparatus, and more particularly to such apparatus adapted to transmit energy from an alternating current circuit to a direct current circuit.

Heretofore, there have been devised various electric valve converting apparatus for transmitting energy from alternating current circuits to direct current circuits, and in such valve converting apparatus it has been customary to provide a pair, or pairs, of electric valves for each phase conductor oppositely disposed with respect to said load circuit, which alternately serve to rectify the positive and negative half cycles of the alternating current.

It is an object of my invention, therefore, to provide an improved electric valve converting system for transmitting energy from an alternating current circuit to a direct current circuit which will overcome the above-mentioned necessity for a pair, or pairs, of electric valves to rectify an alternating current and whereby a single valve or rectifier may be used for each phase conductor to accomplish the same result as the prior art arrangements in a satisfactory and reliable manner.

Another object of my invention is to provide an improved electric valve converting system for transmitting electrical energy from an alternating current circuit to a direct current circuit, which is readily adaptable to single phase and polyphase alternating current generators, and which permits rectification of alternating currents by the use of a minimum number of electric valves, resulting in an inexpensive and efficient converting apparatus.

For a better understanding of my invention together with other and further objects thereof, reference is had to the following description taken in connection with the accompanying drawing, and its scope will be pointed out in the appended claims.

In the drawing, Fig. 1 illustrates an apparatus embodying my invention for transmitting energy from a three-phase alternating current generator to a direct current load circuit; Fig. 2 represents the conventional electrical winding connections for a three-phase, Y-connected alternating current generator; Fig. 3 shows diagrammatically the manner in which the windings are connected in a generator operating in accordance with the principles of my invention; Fig. 4 shows certain wave forms incident to the winding connection of Fig. 3, and Fig. 5 shows certain wave forms appearing in my converting apparatus to aid in the understanding of the invention.

Referring now to Fig. 1, I have illustrated an arrangement for transmitting energy from a two-pole, three-phase alternating current generator 1 to a direct current load circuit 2 through electronic devices 3, 4 and 5, preferably of the gas-filled type, which are provided with anodes 9, 10 and 11, respectively, cathodes 6, 7 and 8, respectively, and control electrodes 12. The alternating current generator 1 is provided with windings $a$, $b$ and $c$ and a connection-reversing or switching device consisting of three separate sets of contacts, one set of contacts for each of the three phases. This connection-reversing device may be constructed integral with the generator or it may be a separate device rotating synchronously with the generator. The contacts 14 and 15 are associated with phase $a$, and electrically insulated from each other by members 16, and the contacts associated with phases $b$ and $c$ are 17, 18 and 19, 20, respectively, which are likewise insulated from each other by members 16' and 16", respectively. It will be noted that the separate contacts for each of the individual phase windings extend practically 180 electrical degrees and that the sets of contacts for the individual phase windings with respect to the insulating members 16, 16', and 16", are displaced progressively 60 electrical degrees in an order corresponding to the order of phase rotation of the phase windings. In a system using an $n$ phase generator, each individual set of phase contacts will be displaced $\pi/n$ electrical degrees. One terminal of each of said phase windings is connected at any given instant to one side of the direct current load circuit 2 through one of the brushes 22, and the other terminal of each of the windings at any given instant is connected to the anode of an associated electrical valve through one of the brushes 21. Instead of using a plurality of single anode, single cathode electric valves, it will be understood that a rectifier of the type having a plurality of anodes and a single cathode may be used, if desired. It will be readily understood by those skilled in the art that by means of the phase shifting grid control circuit 13, the point in the cycle of alternating potential at which each of the several valves is made conductive may be adjusted to control the voltage impressed upon the direct current circuit 2 and the power factor at which current is delivered from the alternating current generator 1.

Referring now to Fig. 3, according to my invention, I have chosen to connect the windings of the alternating current generator to obtain the phase rotation as shown in this figure. That is, in a generator having $n$ phases the phase windings are connected so that they are $\pi/n$ electrical degrees out of phase. For example, in the three-phase alternator shown in Fig. 1, the windings will be 60 electrical degrees out of phase. By virtue of the above-described connection-reversing device I provide for the reversal of the connections to these windings so that each winding applies a positive potential to the anode of its associated electric valve twice during each cycle.

Referring now to Figs. 2 and 4, it will be understood that where a three-phase alternating current generator is connected in the conventional manner it would be impossible to obtain other than a half-wave rectification where only one electric valve is used with each phase conductor, by virtue of the fact that during the negative half cycle no current will be conducted through the associated electric valve. It will also be apparent to those skilled in the art that by virtue of my invention I obtain full wave rectification using only one valve or unidirectional conducting device per phase conductor, resulting in an increase in the utilization factor of the windings of the generator.

Referring now to Fig. 5 which shows the wave forms of the voltages applied to the electric valves, it will be understood that each electric valve, and hence each phase winding, operates for two 60 degree periods during each cycle and that the rectified current wave form, illustrated by the heavy solid line B, will be the same as that obtained by using six-phase rectification. Whereas, if only three electric valves are used in a rectifying system using a conventional three-phase, Y-connected supply the wave form of the rectified current will be as indicated by the heavy solid line A in Fig. 4.

In explaining the operation of the apparatus described in Fig. 1, it will be assumed that the three-phase generator and connection-reversing device are rotating in synchronism and that the phase windings of the generator are connected as shown in Fig. 3. When the windings are connected in this manner their voltages will be 60 degrees out of phase and, through the aid of the connection-reversing device, these windings will apply positive potentials to the valves in the order shown in Fig. 3. If the phase voltages of a conventional three-phase generator be designated as $a$, $b$, $c$, as in Fig. 2, the phase voltages of a generator operating in accordance with my invention, as in Fig. 3, may be designated as $a$, $c'$, $b$, where $c'$ represents the voltage in phase $c$ when the connections to phase $c$ are reversed to cause its voltage to be displaced from the voltage of phase $a$ by 60 degrees. By virtue of the connection-reversing device the connections of the phase windings of $a$, $c$, $b$ will be reversed at certain times indicated by $x'$, $y'$ and $z'$ in Fig. 5, so that each winding applies a positive potential to its associated electric valve twice during each cycle.

It will be observed that due to the inherent operation of the electric valves, each valve will conduct current only while its anode potential is more positive than the anode potentials of the remaining valves. For example, valve 3 will conduct current during the interval $z$—$x$ designated in Fig. 5, and at the instant $x$ when the voltage of phase $c$ becomes more positive than the voltage of phase $a$, valve 4 will conduct and the current will be commutated from valve 3 to valve 4. In like manner, the current will be commutated from valve 4 to valve 5 at the time $y$ when the potential of phase $b$ becomes more positive than the potential of phase $c$.

In the position of the alternator and connection-reversing device shown in Fig. 1, the phase voltages will have a relation corresponding to that indicated at point C in Fig. 5. An advantage of the apparatus above described will be evident from an examination of Fig. 5, from which it will be readily understood that by virtue of my invention commutation of the current from one phase winding to another will be accomplished by the electric valves prior to the reversal of the connections. And likewise, each winding does not carry current until the lapse of an appreciable time after the connection has been established. In a system using an $n$ phase alternator operating in accordance with the principles of my invention, each phase winding will carry current only $\pi/n$ electrical degrees each half cycle and the phase connections will not be reversed until substantially $$\frac{\pi(n-1)}{2n}$$

electrical degrees after commutation of current in the individual phases. For example in the three-phase system shown in Fig. 1, the connections are not reversed until 60 electrical degrees after the current has been commutated, nor will the various phase windings carry current until 60 electrical degrees after the connection has been established.

I have shown and particularly described certain embodiments of my invention and certain methods of operation embraced therein for the purpose of explaining its principle and showing its application, but it will be obvious to those skilled in the art that many modifications and variations are possible without departing from my invention, and I aim, therefore, to cover in the appended claims all such modifications and variations as fall within the true spirit and scope of my invention.

What I claim as new and desire to secure by Letters Patent of the United States, is:

1. In a full-wave rectifying system, the combination of a source of alternating current, a direct current load circuit, an electronic rectifier for supplying unidirectional current to said load circuit, and means for connecting said rectifier to said source, said means including a connection-reversing device for reversing the connection of said source to said rectifier as the potential of said source reverses polarity to permit said rectifier to conduct current twice during each cycle of voltage of said source.

2. In combination, a dynamo-electric machine having a winding in which is induced an alternating potential, a direct current load circuit, an electronic device connected between said winding and said load circuit for supplying unidirectional current to said load circuit, and a switching device rotating in electrical synchronism with said winding to reverse the connection of said winding to said electronic device when the potential of said winding reverses polarity to permit said electronic device to conduct current twice during each cycle of said potential to effect full-wave rectification.

3. In combination, a polyphase alternating current generator having a plurality of windings, a direct current load circuit, a plurality of electric valves each associated with a different one of said windings for supplying unidirectional current to said load circuit, and means for connecting said valves to said windings, said means comprising a connection-reversing device rotating in electrical synchronism with said windings and arranged to reverse the connections for each of said windings to its associated valve when the potential of said winding reverses polarity to permit each of said valves to conduct current twice during each cycle of voltage of the associated winding to effect full-wave rectification.

4. In combination, an $n$ phase alternating current generator, a direct current load circuit, $n$ electric valves each associated with a different one of said phases to rectify the alternating current and to effect commutation of current from one phase winding to another, and means comprising a switching device for reversing the connections of each of said phase windings to said valves, said device being arranged to effect reversal of said connections for each of said phase windings after commutation of the current in that winding to permit each of said valves to conduct current twice during each cycle of potential of said generator to effect full-wave rectification.

5. In combination, a polyphase alternating current generator, a direct current load circuit, electric valves each associated with a different phase to rectify the alternating current and to effect commutation of current from one phase winding to another, and means comprising a connection-reversing device for reversing the connections of said generator to said valves and arranged to permit each of said valves to conduct current twice during each cycle of potential of said generator to effect full-wave rectification, said device being arranged to effect reversal of said phase winding connections in a sequence corresponding to the order of phase rotation.

6. In a full-wave rectifying system including a source of alternating current having a plurality of windings, a direct current load circuit, electronic devices for supplying unidirectional current to the load circuit and a connection-reversing device for connecting one terminal of each of the windings to an associated one of the electronic devices, the method of rectifying the alternating current which comprises utilizing the source during both the positive and negative half-cycles by reversing the connection of each of the windings to the associated electronic device when the potential of that winding reverses polarity to permit each of said devices to conduct current twice during each cycle of potential of the associated phase winding.

7. In combination, a polyphase alternating current generator having a plurality of windings, a direct current load circuit, an electronic rectifying means of the type having a plurality of anodes and a cathode for supplying unidirectional current to said load circuit and having said cathode connected to one side of said load circuit, and means for connecting one terminal of each of said windings to a predetermined one of said anodes and for connecting the other terminal of each of said windings to the other side of said load circuit, said means comprising a connection-reversing device rotating in electrical synchronism with said windings and arranged to reverse the connections for each of said windings to its associated anode when the potential of the associated winding reverses polarity to permit each of said anodes to conduct current twice during each cycle of potential of the associated phase winding to effect full-wave rectification.

8. In combination, an $n$ phase alternating current generator, a direct current load circuit $n$ electric valves of the type having an anode and a cathode each associated with a different one of said phases for rectifying the alternating current and to effect commutation of current from one phase winding to another and having said cathodes connected to one side of said load circuit, and means comprising a switching device for connecting one terminal of each of said phase windings to a predetermined one of said anodes and for connecting the other terminal of each of said phase windings to the other side of said load circuit, said device being arranged to effect reversal of the connections for each of said phase windings after commutation of the current in that particular phase to permit each of said valves to conduct current twice during each cycle of potential of the associated phase to effect full-wave rectification.

9. In a full-wave rectifying system, the combination of a polyphase alternating current generator having a plurality of phase windings, an electric valve means comprising a plurality of anodes and a cathode for rectifying the alternating current and for effecting commutation of the current from one phase winding to another and having said cathode connected to one side of said load circuit, and means comprising a connection-reversing device for connecting one terminal of each of the phase windings of said generator to a predetermined one of said anodes and for connecting the other terminal of each of said phase windings to the other side of said load circuit, said device cooperating with said generator to effect reversal of the connections for each of said phase windings after commutation of the current in that phase winding and to effect reversal of connections for the various phase windings in a sequence corresponding to the order of phase rotation of the potentials of said phase windings to permit each of said anodes to conduct current twice during each cycle of the associated phase winding.

10. In combination, an $n$ phase alternating current generator, a direct current load circuit, $n$ electric valves of the type having an anode and a cathode and each being associated with a different one of said phases for rectifying the alternating current and for effecting commutation of current from one phase winding to another and having said cathodes connected to one side of said load circuit, and means comprising a connection-reversing device for connecting one terminal of each of said phase windings to a predetermined one of said anodes and for connecting the other terminal of each of said phase windings to the other side of said load circuit, said device being arranged to effect reversal of the connections for the various phase windings in a sequence corresponding to the order of phase rotation of the potentials of said phase windings to permit each of said valves to conduct current twice during each cycle of potential of the associated phase winding.

11. In combination, an $n$ phase alternating current generator, a direct current load circuit, $n$ electric valves of the type having an anode and a cathode for rectifying the alternating current and for effecting commutation of current from one phase winding to another and having said cathodes connected to one side of said load circuit, and means comprising a connection-reversing device for connecting one terminal of each of said phase windings to a predetermined one of said anodes and for connecting the other terminal of each of said phase windings to the other side of said load circuit, said device being arranged to effect reversal of the connections for each of said phase windings substantially $$\frac{\pi(n-1)}{2n}$$

electrical degrees after commutation of the current in that particular phase winding to permit each of said valves to conduct current twice during each cycle of potential of the associated phase.

12. In combination, an alternating current generator having $n$ phase windings, a direct current load circuit, electric valve means comprising $n$ anodes and a cathode for rectifying the alternating current and for effecting commutation of current from one phase winding to another and having said cathode connected to one side of said load circuit, and means arranged to permit each of said anodes to conduct current twice during each cycle of potential of the associated phase winding comprising a connection-reversing device cooperating with an electrical brush for each of said phase windings for connecting one terminal of each of said phase windings to a predetermined one of said anodes and for connecting the other terminal of each of said phase windings through said brushes to the other side of said load circuit, said device being provided with a set of two associated electrically insulated contacts for each of said phase windings and having two electrically insulating junctions for each set of said associated contacts and having each contact extending practically 180 electrical degrees, each set of said contacts being displaced progressively $\pi/n$ electrical degrees relative to the insulating junctions of the phase preceding it in the order of phase rotation of said phase windings.

13. In combination, a dynamo-electric machine having a winding in which is induced an alternating potential, a direct current load circuit, an electronic device for supplying unidirectional current to said load circuit, means for controlling the conductivity of said electronic device and for controlling the voltage of said load circuit, and a switching device rotating in electrical synchronism with said winding to reverse the connection of said winding to said electronic device when the potential of said winding reverses polarity to permit said device to conduct current twice during each cycle of potential of the associated phase winding to obtain full-wave rectification.

PHILIP M. CURRIER.